(12) United States Patent
Shioya et al.

(10) Patent No.: US 6,664,699 B2
(45) Date of Patent: Dec. 16, 2003

(54) ROTARY ELECTRIC MACHINE

(75) Inventors: Nobuhiro Shioya, Kariya (JP); Hitoshi Irie, Nagoya (JP)

(73) Assignee: Denso Corporation, Kariya (JP)

( * ) Notice: Subject to any disclaimer, the term of this patent is extended or adjusted under 35 U.S.C. 154(b) by 12 days.

(21) Appl. No.: 09/925,604

(22) Filed: Aug. 10, 2001

(65) Prior Publication Data

US 2002/0047470 A1 Apr. 25, 2002

(30) Foreign Application Priority Data

Aug. 11, 2000 (JP) ......................................... 2000-243963

(51) Int. Cl.⁷ ............................................... H01R 39/38
(52) U.S. Cl. ............................ 310/239; 310/58; 310/59
(58) Field of Search ............................ 310/239, 59, 58, 310/60 A, 60 R, 62, 63, 88

(56) References Cited

U.S. PATENT DOCUMENTS 4,094,033 A * 6/1978 Stein et al. .................. 15/41 R
5,424,600 A * 6/1995 Ishikawa et al. ............ 310/220

FOREIGN PATENT DOCUMENTS

JP         A-9-182353        7/1997

* cited by examiner

Primary Examiner—Thanh Lam
(74) Attorney, Agent, or Firm—Oliff & Berridge, PLC

(57) ABSTRACT

A rotary electric machine has a brush assembly that defines a slip ring cavity enclosing slip rings and brushes. The brush assembly provides two different outlets for particles and cooling air. The first outlet is located on a side with respect to a shaft and is directed in an axial backward direction. The second outlet is located on a bottom and is directed in a radial downward direction. The second outlet is close to a fan for inducing airflow in the slip ring cavity.

20 Claims, 9 Drawing Sheets

ROTARY ELECTRIC MACHINE

CROSS REFERENCE TO RELATED APPLICATION

This application is based on Japanese Patent Application No. 2000-243963 filed on Aug. 11, 2000, the contents of which are incorporated herein by reference.

BACKGROUND OF THE INVENTION

1. Field of the Invention

The present invention relates to a rotary electric machine which has a slip ring cavity enclosing a slip ring and a brush.

2. Description of Related Art

JP-A-9-182353 shows a conventional arrangement of an alternator for vehicle that has a passage on a flange portion of a rear frame. This conventional arrangement prevents the entry of foreign substances, e.g. water, sand or salt, by assembling a brush member with a labyrinth packing provided between a brush holder and a rear cover. The passage is effective to excrete dust resulting from sliding slip rings and brushes.

However, mud or the like might closes the passage of the prior art.

SUMMARY OF THE INVENTION

These drawbacks addressed by providing an improved arrangement for cooling a rotary electric machine.

According to a first aspect of the present invention, a rotary electric machine comprises a brush assembly for supporting the brush and for providing a slip ring cavity that encloses the slip ring. The brush assembly defines a first passage communicating with an inside and an outside the slip ring cavity. The first passage has a first opening that opens in an axial direction of the shaft. The brush assembly further defines a second passage communicating with the inside and the outside the slip ring cavity. The second passage has a second opening that opens in a radial direction of the shaft and is located on a different location from the first opening. One advantage of this structure is that is possible to reduce a possibility that both of the openings are blocked.

According to another aspect of the present invention, the second passage may have a higher pressure drop than that of the first passage, and the second opening may be located closer to an inlet of a fan than the first opening. This structure further enhances the ability to reduce a possibility that both of the openings are blocked.

According to yet another aspect of the present invention, the second opening may be located on a bottom region of the brush assembly when it is installed for usage.

According to still another aspect of the present invention, the second opening may be located circumferentially different from the first opening.

According to another aspect of the present invention, a rotary electric machine comprises first and second discharging means. The first discharging means discharges air from a slip ring cavity in a first direction at a first location. The second discharging means discharges air from the slip ring cavity in a second direction different from the first direction at a second location different from the first location. One advantage of this structure is that is possible to reduce a possibility that both of the openings are blocked.

BRIEF DESCRIPTION OF THE DRAWINGS

Other features and advantages of the present invention will be appreciated, as well as methods of operation and the function of the related parts, from a study of the following detailed description and the drawings, all of which form a part of this application. In the drawings.

DETAILED DESCRIPTION OF PREFERRED EMBODIMENTS

Figure 1:
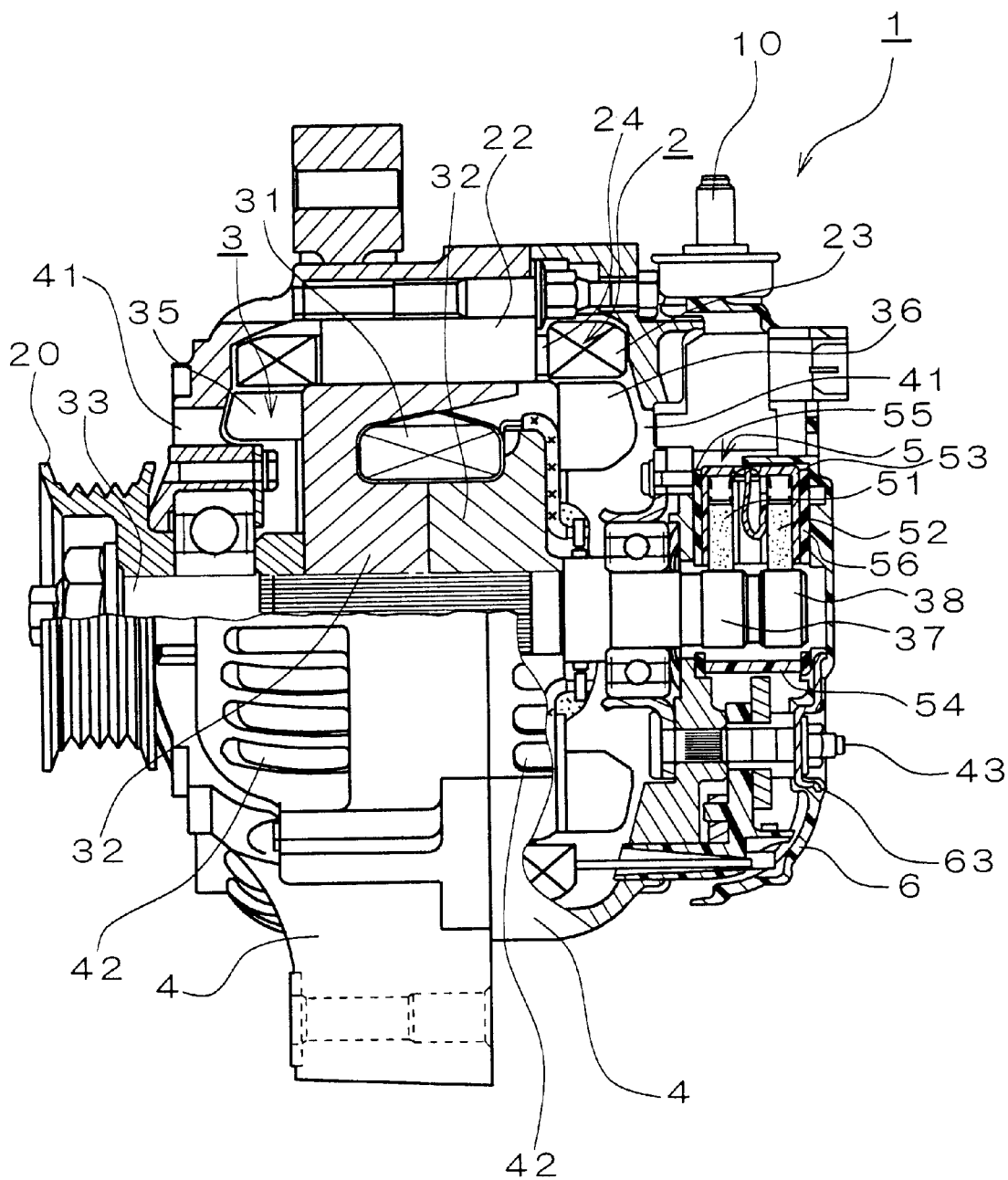
FIG. 1 is a cross sectional view of an alternator according to a first embodiment of the present invention.

An alternator 1 for a vehicle according to a first embodiment of the present invention is described with reference to the drawings.

The alternator 1 has a stator 2, a rotor 3 and a frame 4. The frame 4 supports the stator 2 and the rotor 3. The frame 4 also supports a brush unit 5 and a rear cover 6 on its outside. The alternator 1 is located in an engine room and mounted on a vehicular internal combustion engine via mounting stays extending from the frame 4. The alternator 1 is mounted such that, e.g., a rotating axis thereof is along a horizontal direction.

The stator 2 is supported and fixed on the frame 4. The stator 2 has a stator core 22, a stator winding 23 and insulators 24 insulating the stator winding 23 from the stator core 22. The stator winding 23 is connected to an output terminal 10 via a rectifier mounted on the frame 4.

The rotor 3 is rotatably supported on the frame 4. The rotor 3 has a field winding 31 wound an insulated copper wire into a cylindrical shape. The field winding 31 is embraced between a pair of pole cores 32. Each pole core has six claw-poles. The pole cores 32 are fixed on a shaft 33 to form a Lundel type core with twelve poles. A cooling fan 35 is mounted on a front end of the pole core 32 by welding or the like. Likewise, a cooling fan 36 is mounted on a rear end of the pole core 32. The cooling fans 35 and 36 are centrifugal fans for introducing air axially and discharging air radially toward the stator winding 23.

To provide a field current to the field winding 31, a slip ring assembly is fixed on a rear part of the shaft 33. The slip ring assembly has a pair of slip rings 37 and 38 disposed on an outside the frame 4. The slip rings 37 and 38 are connected to the field winding 31. A pulley 20 for receiving a rotating force of the internal combustion engine is fixed on the shaft 33.

The frame 4 has a plurality of air inlets 41 and air outlets 42. The air inlets 41 are located on both axial ends of the frame 4. The air outlets 42 are located on a radial outside wall of the frame 4 in two rows so that cooling air passes through the stator winding 23.

The brush unit 5 for supporting brushes is disposed on a rear end of the alternator 1. The brush unit 5 has a pair of brushes 51 and 52, a brush holder 53, and a cover 54. The slip rings 37 and 38 and the brushes 51 and 52 are protected by means for enclosing them in a slip ring cavity. In this embodiment, the slip ring cavity is provided by a brush assembly that includes the brush holder 53, the cover 54, the frame 4 and the rear cover 6. However, the slip ring cavity may be provided by another combination of elements, or a single element.

Figure 2:
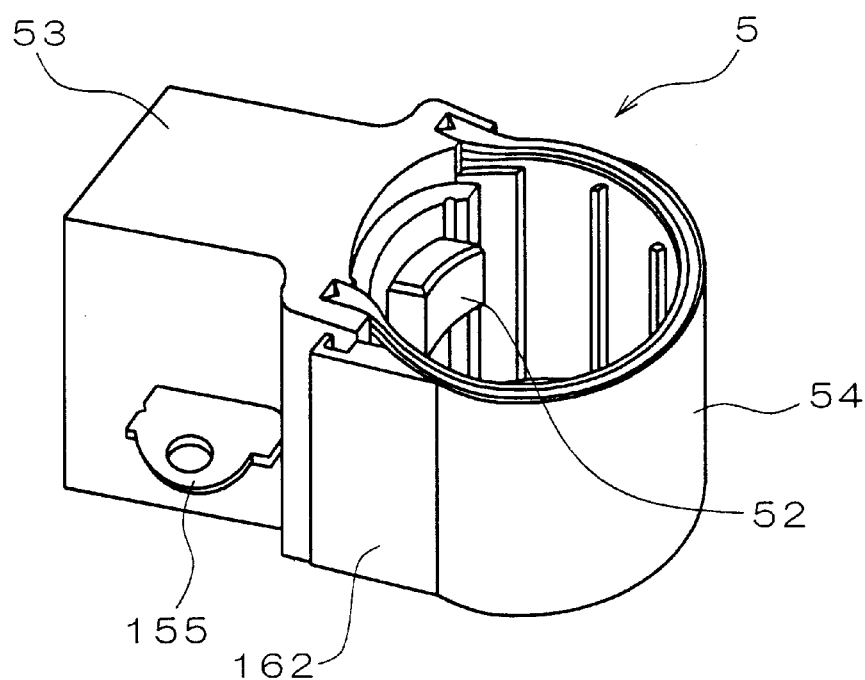
FIG. 2 is a perspective view of a brush holder and a brush cover according to the first embodiment of the present invention.

Each of the brushes 51 and 52 contacts a respective one of slip rings 37 and 38. The brushes 51 and 52 are supported by and accommodated within the brush holder 53. The cover 54 is connected with the brush holder 53 at its side ends in a sealing manner as shown in FIG. 2.

Figure 3:
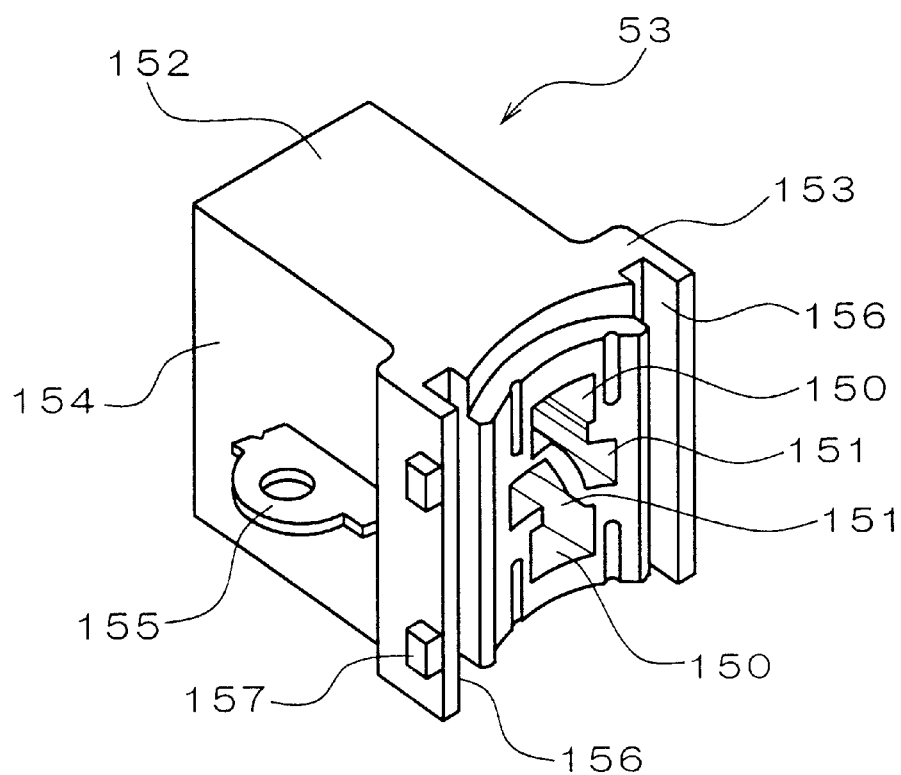
FIG. 3 is a perspective view of the brush holder according to the first embodiment of the present invention.

The brush holder 53 may be made, e.g., of a thermosetting resin. The brush holder 53 has a main body 152 like a box that has symmetrically arranged two holding slots each including a brush slot 150 for the brush 51 or 52 and a pigtail slot 151 for a pigtail of the brush as shown in FIG. 3. A pair of positive and negative terminals 155, partly protruded on both side surfaces, are integrated, e.g., by an insert molding. The brush holder 53 has a flange 153 on its slip ring side. The flange provides a concave surface parallel to the slip rings 37 and 38 and forming an approximately cylindrical cavity with the cover 54 as shown in FIG. 2. The flange 153 has a pair of grooves 156 on each circumferential side of the concave surface and a plurality of protrusions 157 on each circumferential end.

Figure 4:
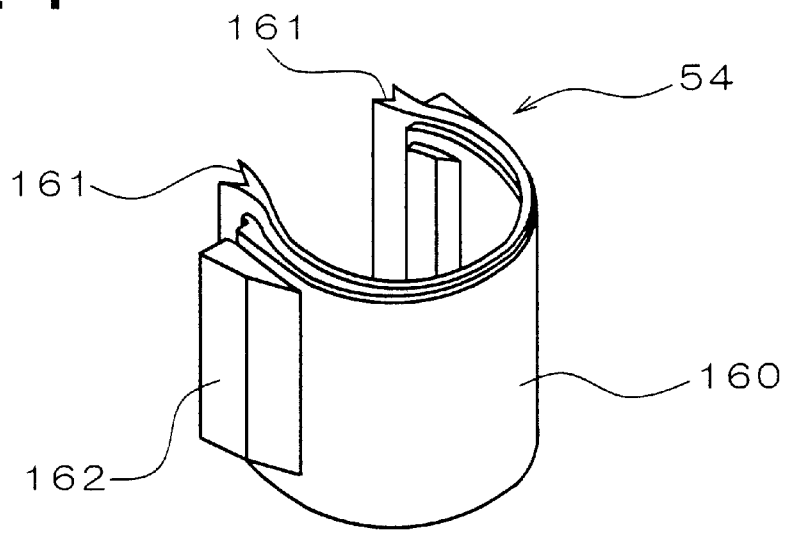
FIG. 4 is a perspective view of the brush cover according to the first embodiment of the present invention.
Figure 5:
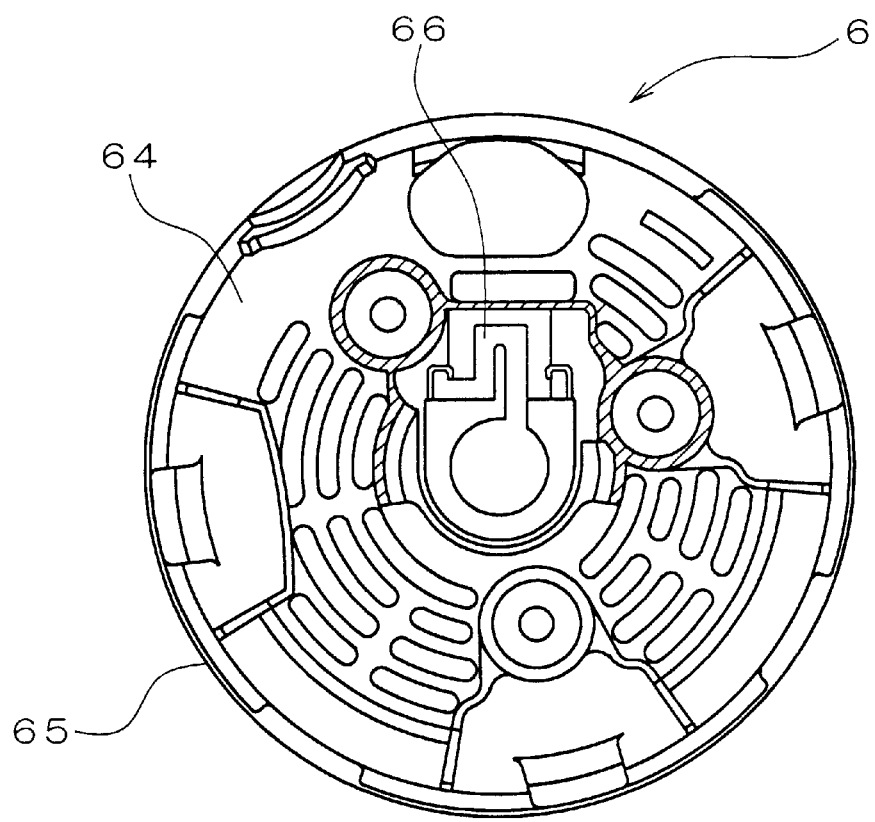
FIG. 5 is a plan view showing an inside arrangement of a rear cover according to the first embodiment of the present invention.

Referring to FIG. 4, the cover 54 has a generally cylindrical shape, e.g., ¾ of a circle. The cover 54 has a wall 160, a pair of grooved ends 161 and a pair of hooks 162. The cover 54 is made of a resin, e.g. nylon. The grooved ends 161 are elastic for providing an adequate seal when it put into the groove 156. The grooved ends 161 may be replaceable with seal members. The hooks 162 engage on the protrusions 157. A cylindrical portion integrally formed with the frame 4 may be employed instead of the cover 54.

The brush holder 53 is assembled with the cover 54 by sliding it along an axial direction so that the grooved ends 161 are in the grooves 156 and the hooks 162 hook on the protrusions 157. The brush holder 53 and the cover 54 provide flat axial ends as shown in FIG. 2. One or more of the grooves 156, the protrusions 157, the grooved ends 161 and the hooks 162 provide at least a portion of connecting means for connecting the brush holder 53 with the cover 54 in a sealing manner. The brush holder 53 and the cover 54 provide means for surrounding the slip rings 37 and 38.

Figure 7:
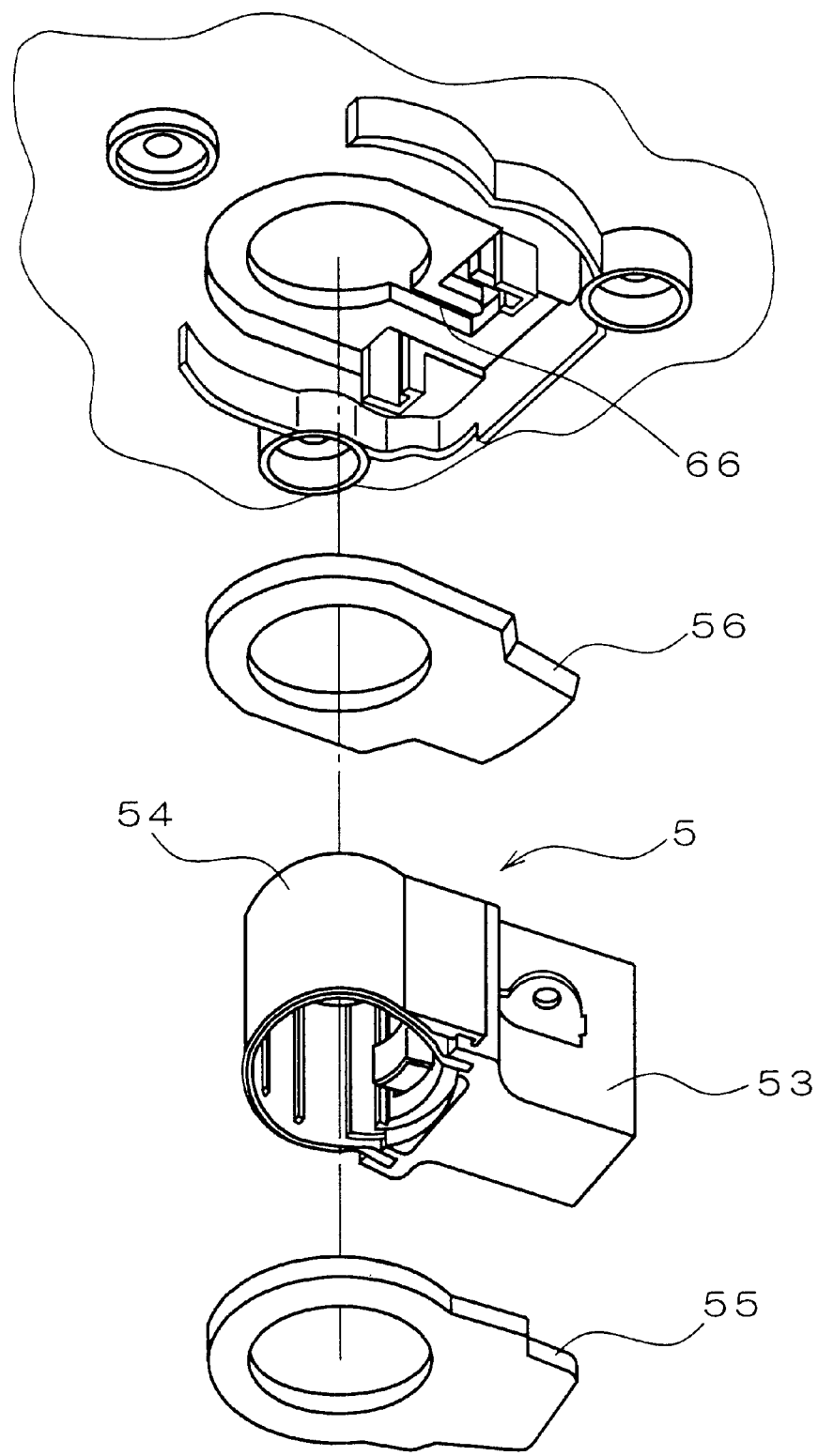
FIG. 7 is a perspective exploded view of parts of a brush assembly according to the first embodiment of the present invention.

Referring to FIG. 7, a sealing member 55 is placed between the frame 4 and the assembly of the brush holder 53 and the cover 54. Likewise a sealing member 56 is placed between the rear cover 6 and the assembly of the brush holder 53 and the cover 54

The rear cover 6 is mounted on the outside of the frame 4 to cover and protect electric parts mounted on the frame 4 including the rectifier, the brush unit 5 and a regulator circuit. The rear cover 6 is made of a resinous material and an insert molded metal member 63. The rear cover 6 has a plurality of radially arranged air inlets and mounting holes for receiving mounting bolts 43. The rear cover 6 is generally formed as a shallow plate that has a flat wall 64 and a cylindrical wall 65.

Figure 6:
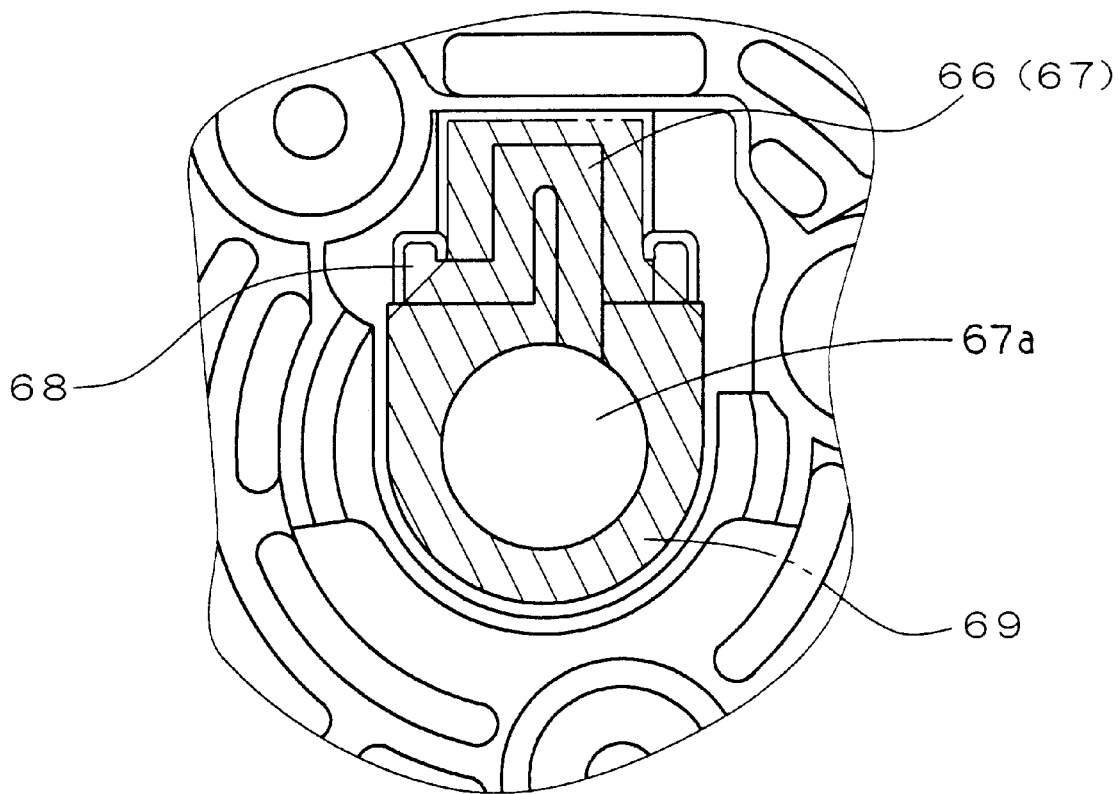
FIG. 6 is an enlarged plan view of FIG. 5 showing a labyrinth passage on the rear cover according to the first embodiment of the present invention.

The rear cover 6 has a groove 66 on its center region opposite to the brush holder 53. The groove 66 has a circular portion and narrow passage portion. Referring to FIG. 6, the sealing member 56 covers an area 69 shown by the hatching. Therefore, the groove 66 and the sealing member 56 form a labyrinth passage 67 that has at least one elbow-shaped bend. In this embodiment, the labyrinth passage 67 provides four elbow-shaped bends including two bends forming a hairpin shaped turn, a bend at right angles and a bend toward an axial direction at its end opening 68. The labyrinth passage 67 communicates a circular depression 67a formed on the center of the rear cover 6 and the end opening 68. The labyrinth passage 67 works as a ventilation passage for taking air into the slip ring cavity. The brush holder 53 or the cover 54 may have an integrally formed rear wall portion that have above-described labyrinth passage 67.

Figure 8:
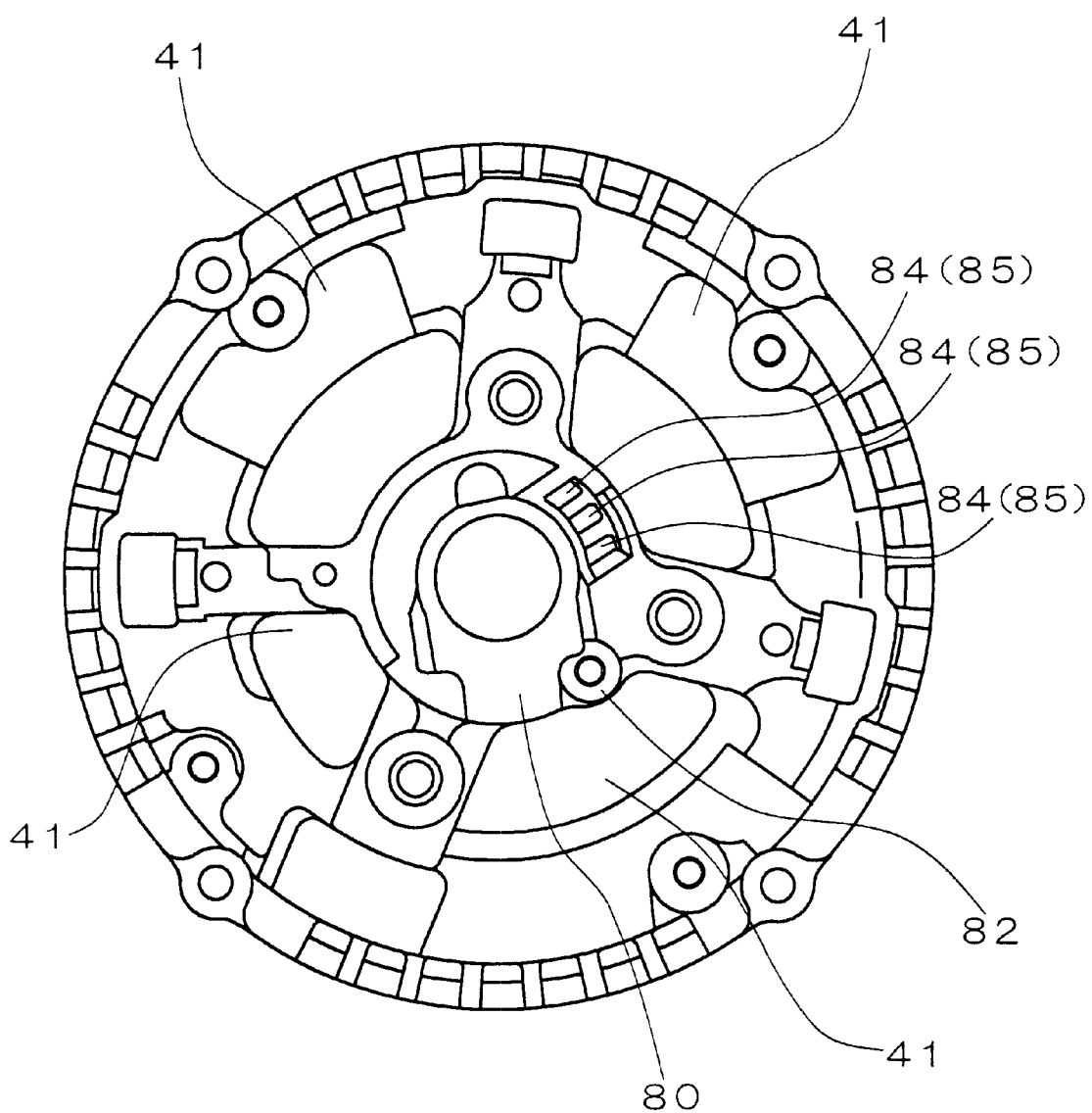
FIG. 8 is a plan view showing an outer end of a rear frame according to the first embodiment of the present invention.
Figure 10:
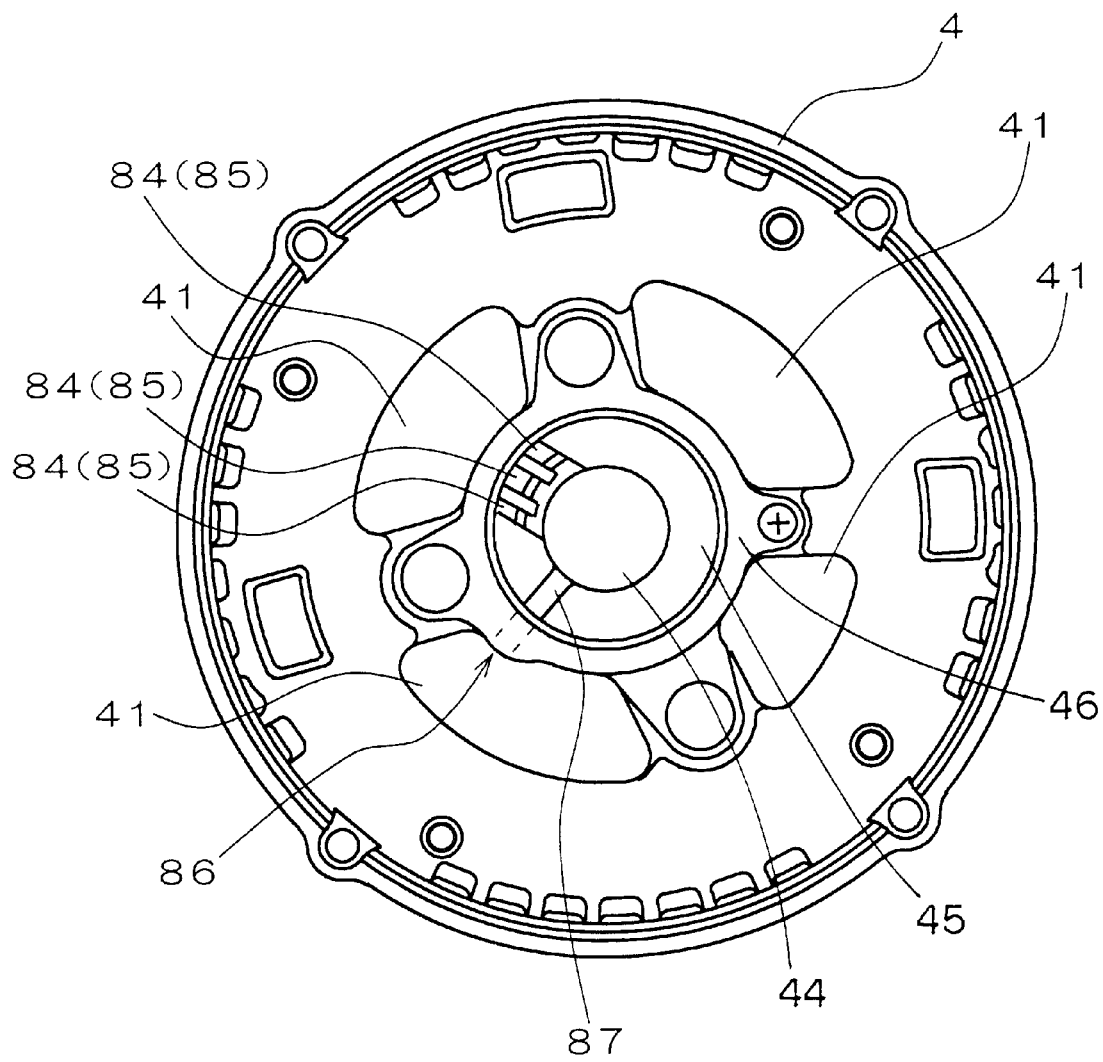
FIG. 10 is a plan view showing an inner end of a rear frame according to the first embodiment of the present invention.

The rear part of the frame 4 has four inlets 41, a center hole 44 in which the shaft 33 is located and a bearing holder 45 as shown in FIG. 10. A bearing 89 is mounted on an axial surface of the bearing holder 45 and is supported with a retainer plate 46. The frame 4 has a flange 80 and a mounting portion 82 on its outside surface as shown in FIG. 8. The flange 80 provides a sealing surface for contacting with the sealing member 55. The mounting portion 82 has a threaded hole for fastening a negative terminal 155 protruding from a side wall 154 of the brush holder 53. The rear part of the frame 4 provides first and second passages 85 and 87 as a discharging means both communicating between the slip ring cavity and cooling air passages of the fan 36 through the hole 44.

Figure 9:
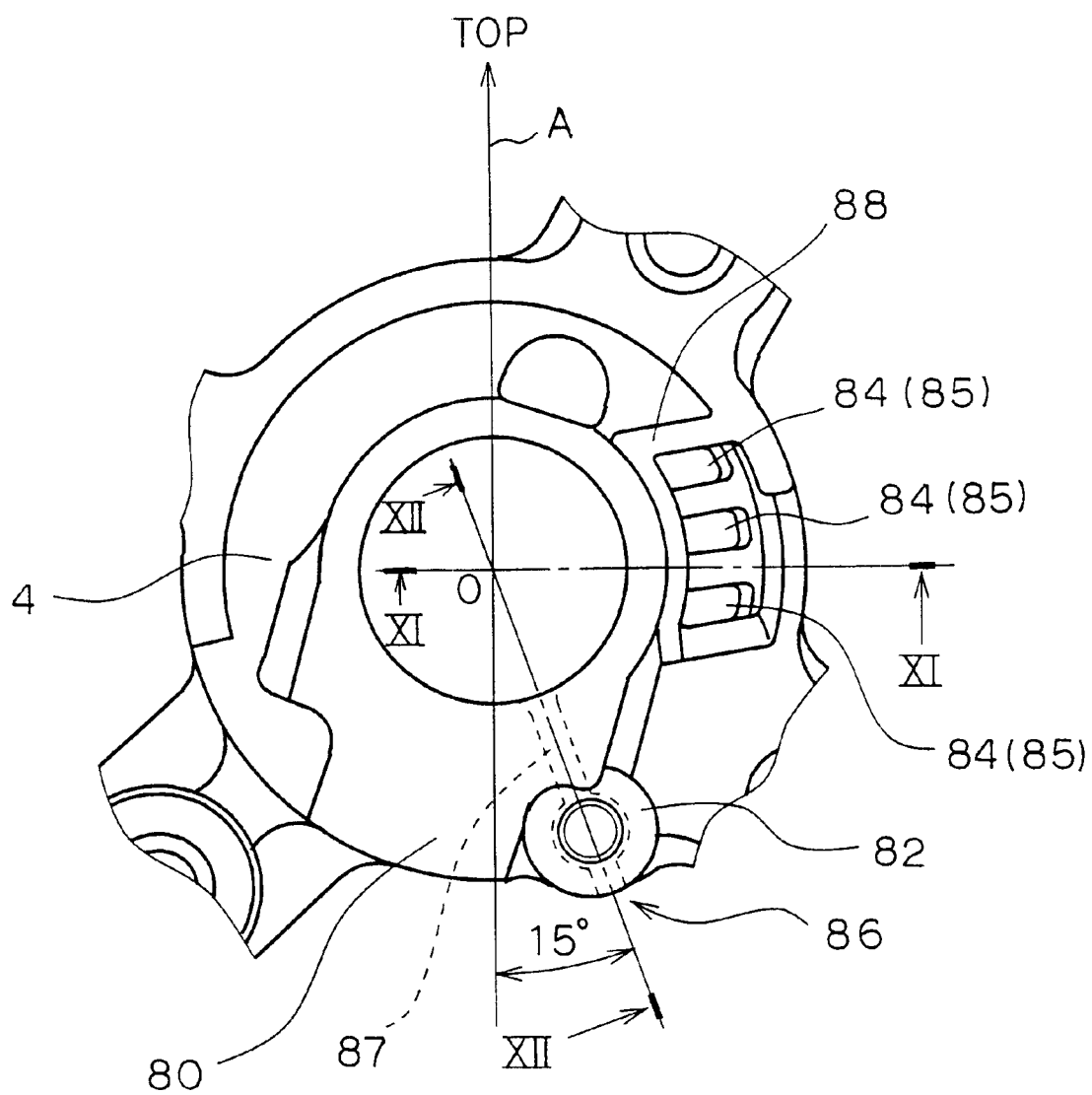
FIG. 9 is an enlarged plan view of FIG. 8 showing ventilation passages according to the first embodiment of the present invention.
Figure 11:
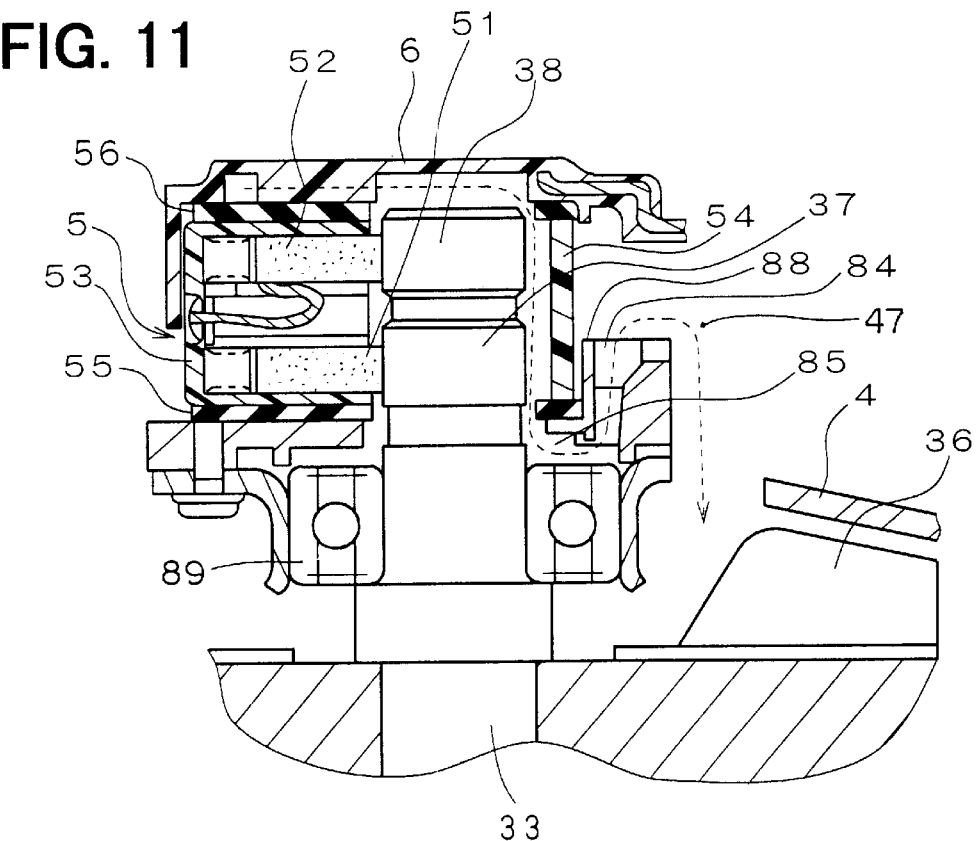
FIG. 11 is a partial cross-sectional view of the alternator showing an axial outlet of the ventilation passage, including a cross-section indicated a line XI—XI in FIG. 9, according to the first embodiment of the present invention.

Referring to FIGS. 9 through 11, the first passage 85 communicates between the slip ring cavity and a cooling air passage 47 formed between the frame 4 and the rear cover 6. The cooling air passage 47 is formed behind the bearing holder 45 and is wider than one of the inlets 41. The first passage 85 is mainly formed on the frame 4 as a groove covered with the bearing 89 and axial holes penetrated through an outside area of the bearing holder 45 as shown in FIGS. 10 and 11. The first passage 85 radially extends from the center hole 44 to the axial holes, bends about 90 degrees toward a rear side, branches into three axial holes, extends axially and opens axially toward the rear side. As a result, the first passage 85 has an L-shape.

Openings 84 open at a side area that is located on at right angles from a vertical axis when the alternator 1 is mounted on a vehicle as shown in FIG. 9. Opening areas of the openings 84 are almost the same as each other. The openings 84 face the rear cover 6 so as to prevent exposing the openings 84 to the outside. The openings 84 are sufficiently spaced apart from the other parts such as the rear cover 6. The wall 88 may be substituted with a groove that performs the same function.

On the axial outside of the frame 4, a wall 88 is protruded above the openings 84. The wall 88 lies along an inner side and a top side of a sector where the openings 84 are laid out as shown in FIG. 9. The sector where the openings 84 are located is slightly concave and directed slightly downward by slanted surfaces as shown in FIGS. 9 and 11. The wall 88 is spaced apart from the cover 54 as shown in FIG. 11. The wall 88 provides a step that guards the openings 84 from foreign substances flowing along the cover 54 and the axial outside of the frame 4. The wall 88 provides means for preventing an entering of the foreign substance into the openings 84.

Figure 12:
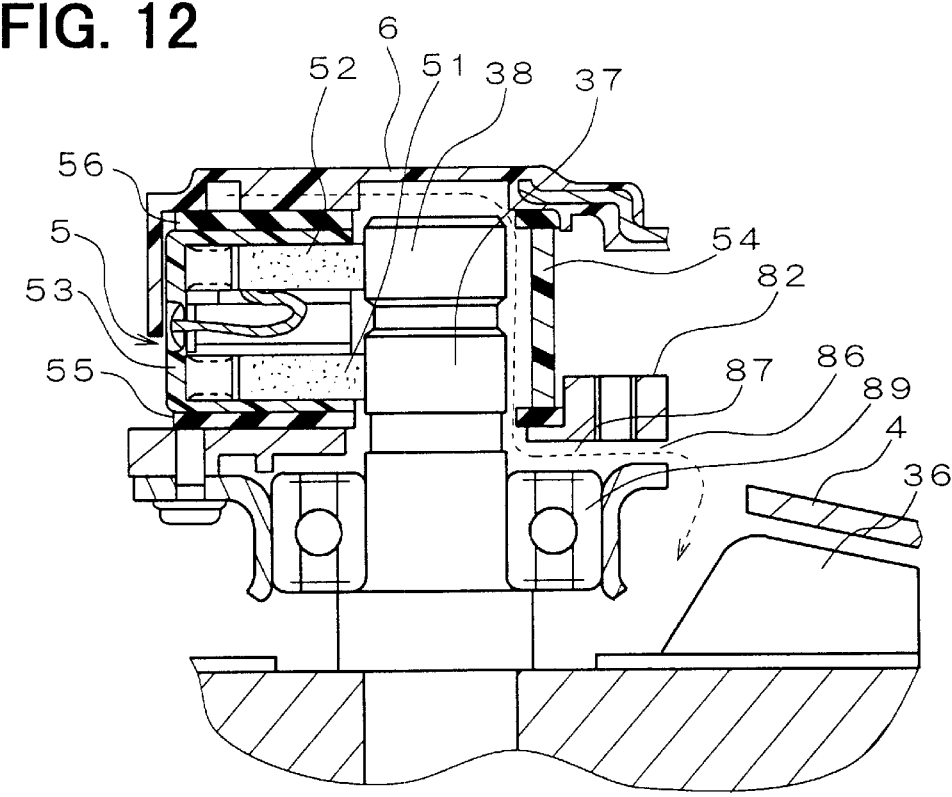
FIG. 12 is a partial cross-sectional view of the alternator showing a radial outlet of the ventilation passage, including a cross-section indicated a line XII—XII in FIG. 9, according to the first embodiment of the present invention.

Referring to FIGS. 9, 10 and 12, the second passage 87 communicates between the slip ring cavity and one of the inlets 41. The second passage 87 is mainly formed on the frame 4 by a groove covered with the bearing 89 as shown in FIGS. 10 and 12. The second passage 87 first radially extends from the center hole 44 and opens radially at opening 86. Therefore, the passage 87 directs air in a downward direction as shown in FIG. 9. Opening 86 opens at a bottom region that is located on 15 degrees from a vertical axis when the alternator 1 is mounted on a vehicle for use as shown in FIG. 9. The opening 86 is circumferentially, axially and radially spaced apart from the openings 84. The opening 86 is sufficiently spaced apart from the other parts, such as the rear cover 6.

The passage 87 has a smaller cross-section than the passage 85 so that the passage 87 has a higher pressure-drop than the passage 85. In this embodiment, the cross-section of the passage 87 is ⅓ of the passage 85. The opening 86 is located closer to the fan 36 and the inlet 41 than the openings 84 so that a greater vacuum pressure affects the opening 86. As a result, it is possible to adjust capabilities of both passages 85 and 87. For instance, it is possible to adjust capabilities of passages 85 and 87 for discharging particles from the slip ring cavity. For example, the flow rate of the passages 85 and 87 may be the same or substantially the same. One of the passages 85 and 87 may be formed on another part or parts that form the brush unit 5.

When the engine rotates the pulley 20, field current is supplied to the field winding 31 through the slip rings 37 and 38. The rotor 2 rotates and generates rotating magnetic field to induce an AC current on the stator winding 23. The induced power is rectified and supplied as a DC power through the output terminal 10. The cooling fans 35 and 36 generate cooling wind from the inlets 41 to the outlets 42.

Particles in the slip ring cavity, e.g. ground powder of the brush, are discharged from the first and second passages 85 and 87 that have relatively simpler shapes than that of the groove 66.

The fan 36 induces a ventilation air flow within the slip ring cavity from the opening 68 to the openings 84 and 86 as shown in FIGS. 11 and 12. This ventilation air flow not only takes the heat out of the slip ring cavity but also facilitates discharging of particles in the slip ring cavity. It is possible to avoid sealing up the slip ring cavity because the alternator 1 has two passages 85 and 87 as outlets that are different in routes, shapes and openings.

The slip rings 37 and 38 and the brush assembly may be arranged in the frame 4. Further, the passages 85 and 87 may be arranged on the brush holder 53 or the cover 54. The present invention can be applied to a generator, a motor or a rotary electric machine that selectively acts as a generator and a motor.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention.

What is claimed is:

1. A rotary electric machine, comprising:
    a slip ring disposed on a shaft of a rotor;
    a brush that contacts the slip ring; and
    a brush assembly that supports the brush and provides a slip ring cavity that encloses the slip ring, wherein the brush assembly defines a first passage communicating with an inside and an outside of the slip ring cavity for discharging air from the slip ring cavity, the first passage having a first opening that opens in an axial direction of the shaft, and wherein the brush assembly defines a second passage communicating with the inside and the outside of the slip ring cavity for discharging air from the slip ring cavity, the second passage having a second opening that opens in a radial direction of the shaft and is located on a different location from the first opening.

2. The rotary electric machine according to claim 1, further comprising a portion disposed along the first opening that prevents entry of a foreign substance into the first opening.

3. The rotary electric machine according to claim 1, further comprising a fan that cools the rotary electric machine, wherein the second passage has a higher pressure drop than that of the first passage, and wherein the second opening is located closer to an inlet of the fan than the first opening.

4. The rotary electric machine according to claim 1, wherein the second opening is located on a bottom region of the brush assembly when it is installed for usage.

5. The rotary electric machine according to claim 1, wherein the brush assembly includes a frame that supports the rotor, and wherein the frame defines the first and second passages.

6. The rotary electric machine according to claim 1, wherein the second opening is located circumferentially offset from the first opening.

7. The rotary electric machine according to claim 1, further comprising a fan that induces cooling air flow,
    wherein the brush assembly further includes a bearing that rotatably supports the shaft and a frame that supports the bearing,
    the frame defining a shaft hole in which the shaft is located and communicating with the slip ring cavity,
    a bearing holder located around the shaft hole,
    a narrower cooling air passage located on a radial outside of the bearing holder,
    a wider cooling air passage located behind the bearing holder and being wider than the narrower cooling air passage, and wherein
    the first passage is formed as a L-shaped passage comprising an axially extending hole penetrating the bearing holder to reach the wider cooling air passage and a radially extending groove formed on the bearing holder communicating between the shaft hole and the axially extending hole, and
    the second passage is formed as a radially extending groove formed on the bearing holder communicating between the shaft hole and the narrower cooling air passage.

8. The rotary electric machine according to claim 7, wherein the slip ring is located on an outside the frame, and
    wherein the brush assembly further includes a brush holder mounted on an outside of the frame that supports the brush, a cover that surrounds the slip ring with the brush holder, a rear cover that covers the brush holder and the brush cover and sealing members disposed between the frame and the slip ring cover and between the slip ring cover and the rear cover.

9. The rotary electric machine according to claim 8, wherein the rear cover defines a third passage communicating with the inside and the outside of the slip ring cavity.

10. The rotary electric machine according to claim 1, wherein the brush assembly further defines a third passage communicating with the inside and the outside of the slip ring cavity, and further comprising a fan that induces cooling air flow from the third passage to the first and second passages through the slip ring cavity.

11. The rotary electric machine according to claim 10, wherein the third passage has more complex shape than that of the first and second passages, and the first passage has more complex shape than the second passage.

12. A rotary electric machine, comprising:

a slip ring disposed on a shaft of a rotor;

a brush that contacts the slip ring; and means for enclosing a slip ring in a slip ring cavity;

intake means for taking air into the slip ring cavity;

first discharging means for discharging air from the slip ring cavity in a first direction at a first location;

second discharging means for discharging air from the slip ring cavity in a second direction different from the first direction at a second location different from the first location; and means for inducing air flow passing through the slip ring cavity.

13. The rotary electric machine according to claim 12, wherein the second location is circumferentially offset from the first location.

14. The rotary electric machine according to claim 12, wherein the second discharging means discharges air downwardly.

15. The rotary electric machine according to claim 12, wherein the first discharging means discharges air in a radial direction.

16. The rotary electric machine according to claim 12, wherein the intake means provides an air passage being more complex than another air passage provided by one of the first and second discharging means.

17. The rotary electric machine according to claim 12, wherein the intake means takes air into an axial end of the cavity, and wherein the first discharging means and the second discharging means discharge air from another end of the cavity.

18. A rotary electric machine, comprising:

a slip ring disposed on a shaft of a rotor;

a brush that contacts the slip ring; and a brush assembly that supports the brush and provides a slip ring cavity that encloses the slip ring, wherein the brush assembly defines a first passage communicating with an inside and an outside of the slip ring cavity, the first passage having a first opening that opens in an axial direction of the shaft, wherein the brush assembly defines a second passage communicating with the inside and the outside of the slip ring cavity, the second passage having a second opening that opens in a radial direction of the shaft and is located on a different location from the first opening, and wherein both the first passage and the second passage communicate with the slip ring cavity at one axial end thereof.

19. The rotary electric machine according to claim 18, further comprising a portion disposed along the first opening that prevents entry of a foreign substance into the first opening.

20. The rotary electric machine according to claim 18, wherein the second opening is located on a bottom region of the brush assembly when it is installed for usage, and wherein the first opening is distanced from the second opening in a circumferential direction.

* * * * *